United States Patent [19]

deVos et al.

[11] Patent Number: 5,076,690

[45] Date of Patent: Dec. 31, 1991

[54] COMPUTER AIDED POSITIONING SYSTEM AND METHOD

[75] Inventors: Leon B. C. deVos, Schiedam; Johannes N. T. M. Schouten, Vlaardingen, both of Netherlands

[73] Assignee: Spectra-Physics Laserplane, Inc., Dayton, Ohio

[21] Appl. No.: 522,745

[22] Filed: May 14, 1990

[51] Int. Cl.$^5$ .................... G01B 11/26; G01C 1/00
[52] U.S. Cl. .................... 356/152; 356/1; 356/400; 235/467
[58] Field of Search .................... 356/51, 152, 400; 350/6.5, 6.9; 235/467; 364/449

[56] References Cited

U.S. PATENT DOCUMENTS

| | | |
|---|---|---|
| 3,588,249 | 6/1971 | Studebaker. |
| 3,813,171 | 5/1974 | Teach et al. |
| 3,873,226 | 3/1975 | Teach. |
| 3,997,071 | 12/1976 | Teach. |
| 4,030,832 | 6/1977 | Rando et al. |
| 4,034,490 | 6/1977 | Teach. |
| 4,035,084 | 7/1977 | Ramsay ........................... 356/152 |
| 4,113,381 | 9/1978 | Epstein ........................... 356/152 X |
| 4,355,895 | 10/1982 | Cairns et al. ........................... 356/141 |
| 4,715,714 | 12/1987 | Gaechter et al. ........................... 356/375 |
| 4,796,198 | 1/1989 | Boultinghouse et al. |
| 4,830,489 | 5/1989 | Cain et al. |
| 4,918,607 | 4/1990 | Wible ........................... 180/169 X |

*Primary Examiner*—Stephen C. Buczinski
*Attorney, Agent, or Firm*—Killworth, Gottman, Hagan & Schaeff

[57] ABSTRACT

A position sensing system calculates the X-Y coordinates of a point using triangulation and determines the direction in which the point is moving. The triangulation calculation is based on the coordinates of at least three retroreflective elements spaced apart from each other around the periphery of a two-dimensional coordinate frame, and the measured angles between the lines projected radially outward from the point to each of the retroreflective elements. The accuracy of the measured angles is achieved by using a rotating member supported by dedicated hardware and controlled by software. The member rotates with a beam of light generated by a light transmitting and detecting device positionable at the point. The light transmitting and detecting device receives the beam of light reflected back from the retroreflective elements and generates an output signal in response thereto. A computer processes the output signals for use in calculating the X-Y position of the point and the orientation of the light transmitting and detecting device when it is positioned at the point.

15 Claims, 6 Drawing Sheets

COMPUTER AIDED POSITIONING SYSTEM AND METHOD

BACKGROUND OF THE INVENTION

The present invention relates generally to laser-based systems useful in construction applications and, more particularly, to a laser-based system and method for measuring the X-Y coordinate of a point in a continuously changing frame of reference.

In the construction industry, the level of automation and robotization is very low. One reason for this is the difficulty of properly positioning machines and tools. In the construction of commercial buildings, for example, various points of reference have to be established, such as placement of floors, ceilings, electrical wiring, plumbing, and heating and cooling ducts. Establishing reference points is time consuming and expensive, particularly as such work is often contracted out to companies which specialize in this work. Moreover, for many applications, the machine has to move toward the product. When the reference point is continuously changing, the difficulty of positioning the machine is compounded.

In prior laser-based systems, such as that disclosed in U.S. Pat. No. 3,588,249, for example, a reference plane is established throughout a work site by a transmitter which emits laser energy in the level reference plane. The laser beam is projected radially outward from the transmitter and rotated continuously through 360 degrees to sweep around the entire work site. One or more receivers may be employed throughout the work site to sense the location of this reference plane. Such receivers may be mounted on a surveyor's rod, as described in U.S. Pat. No. 4,030,832, or they may be employed as part of a control system for construction or agricultural equipment, as described in U.S. Pat. Nos. 3,813,171; 3,873,226; 3,997,071; and 4,034,490.

In order to track the movement of a reference point, prior art laser systems, such as the laser survey system disclosed in U.S. Pat. No. 4,830,489, have provided not only elevation information, but also position information in two other axes. The system includes a laser transmitter, located at a reference position at a work site, which sweeps a laser beam radially in a reference plane. The system includes a receiver, located on mobile earthmoving equipment operating at the work site. The receiver has a sensor that determines the relative elevation of the laser reference plane. The receiver also includes a pair of reflectors, each of which reflects laser energy back to the transmitter. The laser transmitter also has a sensor which receives the reflected laser energy, and, in response thereto, produces receiver position information for transmission to the receiver.

The laser transmitter is designed to rotate the laser beam continuously through 360 degrees at a substantially constant angular velocity and thus sweep the beam past the two reflectors of the receiver once during each revolution. During each revolution of the laser beam, the transmitter receives back two short bursts or pulses of laser energy from the two reflectors. Thus, since the laser beam sweeps at a substantially constant angular velocity and the distance between the reflectors is fixed, the time period between receipt of these two pulses provides an accurate basis for the calculation of the range or distance of the receiver from the transmitter. However, since the accuracy of the range calculation is dependent upon a uniform rotational velocity for the laser beam, any variability in the rotational velocity will decrease the accuracy of the range calculation.

Three-dimensional laser based systems are generally complex and expensive. It is sometimes necessary and, often, sufficient to know only the exact location of a reference point within a two-dimensional framework. A method for locating a reference axis of a mobile robot vehicle in a two-dimensional structured environment is disclosed in U.S. Pat. No. 4,796,198. In that reference, a laser carried by the mobile vehicle generates a rotating beam which strikes retroreflectors located at the periphery of the structured environment. Computation means compute the location of the mobile vehicle based on the location of the retroreflectors and the reflected light. In a 50 foot by 50 foot structured environment, for example, the location coordinates of a moving vehicle can be determined to an accuracy of approximately 1 inch. However, construction industry accuracy requirements often call for accuracies within a centimeter or a few millimeters. In addition, many applications require not only the X-Y position of a point, but also an indication of the direction in which the point is moving or is to be moved.

It is seen then that there is a need for a positioning system and method wherein highly accurate position coordinates and orientation of a point, which are insensitive to deviations in the rotational velocity of the rotating light beam, can be determined.

SUMMARY OF THE PRESENT INVENTION

This need is met by the position sensing system and method of the present invention wherein the X-Y coordinates of a point can be calculated by triangulation. The triangulation calculation is based on the coordinates of at least three retroreflective elements spaced apart from each other around the periphery of a two-dimensional coordinate frame, and the measured angles between the lines projected radially outward from a point located at an actual position of a light transmitting and detecting means to each of the retroreflective elements.

In accordance with one aspect of the present invention, a system for determining the position of a point in a two-dimensional coordinate frame of reference comprises: at least three stationary retroreflective elements spaced apart from each other and stationed at known coordinates in the two-dimensional coordinate frame, the retroreflective elements capable of reflecting light back toward a light source; light transmitting and detecting means, positionable at the point, for generating a rotating beam of light to illuminate each of the stationary retroreflective elements during each rotation, and for detecting the beam of light when it is reflected from the stationary retroreflective elements and generating an output signal in response thereto; and computer means responsive to the output signal for computing, from the known coordinates of the retroreflective elements and from the angular orientation of the beam when the beam illuminates the retroreflective elements, the coordinates of the position of the point in the two-dimensional coordinate frame of reference.

In a preferred embodiment of the system, the light transmitting and detecting means comprises: means for generating a beam of light; means for projecting the beam of light at a substantially constant rotating angular velocity toward the retroreflective elements; means for receiving the beam of light reflected from the retroreflective elements corresponding to the illumination of each of the retroreflective elements during each rotation of the beam; and azimuth means, responsive to reflection of the beam of light from the retroreflective elements, for continuously transmitting angle signals indicative of an azimuth angle at which the means for receiving the beam of light is positioned with respect to each of the retroreflective elements.

In accordance with one aspect of the system for determining the position of a point, at least one of the stationary retroreflective elements is a distinctive retroreflective element, such as a retroreflective bar code element. In a structured environment, then, the computer means can designate a sequential number to each retroreflective element in a rotation, and the number will remain the same for each rotation.

In a further aspect of the present invention, the light transmitting and detecting means includes a member rotating with the beam, the member having a periphery and further having a plurality of angularly positioned elements spaced around the periphery which divide a revolution of the member into a plurality of generally equal partial revolutions; and a means for detecting movement of each of the elements past a predetermined point as the member rotates. Preferably, the plurality of angularly positioned elements comprises a plurality of apertures and the means for detecting movement of each of the elements comprises a light source paired with a photodetector element.

The present invention also provides a method for determining the position of a point in a two-dimensional coordinate frame of reference. The method comprises the steps of: locating at least three stationary retroreflective elements spaced apart from each other and stationed at known coordinates in the two-dimensional coordinate frame, the retroreflective elements capable of reflecting light back toward a light source; transmitting a rotating beam of light in a plane to illuminate each of the stationary retroreflective elements during each rotation; calculating an angle between the direction of the beam of light when the beam illuminates each of the retroreflective elements; tracking behavior of a rotation; using the behavior of a rotation to calculate angular measurements; and determining the position of the point based on the angular measurements and the coordinates of the retroreflective elements.

In a preferred embodiment of the method for determining the position of the point, the step of tracking behavior of a rotation further includes the steps of mounting a member on a rotating shaft, the member having a periphery and further having a plurality of apertures located at the periphery which divide a revolution of the member into a plurality of generally equal partial revolutions; and registering a time differential between each adjacent pair of the plurality of apertures as the member rotates. Also, the method includes the step of interpolating between corresponding angle measurements of an adjacent pair of the plurality of apertures to determine exact angles between each pair of apertures.

Accordingly, it is an object of this invention to provide a position sensing system and method, wherein the X-Y coordinates of a point can be calculated by triangulation. It is also an object of this invention to provide such a system and method wherein the orientation of the system when it is located at the point can be determined. It is a further object of this invention to provide such a system wherein the calculations are insensitive to deviations in the rotational velocity of the rotating light beam. Finally, it is an object of this invention to provide such a system which utilizes software to calibrate a code wheel or other member to improve the accuracy of the calculations.

Other objects and advantages of the invention will be apparent from the following description, the accompanying drawings and the appended claims.

DETAILED DESCRIPTION OF THE PREFERRED EMBODIMENT

Figure 1:
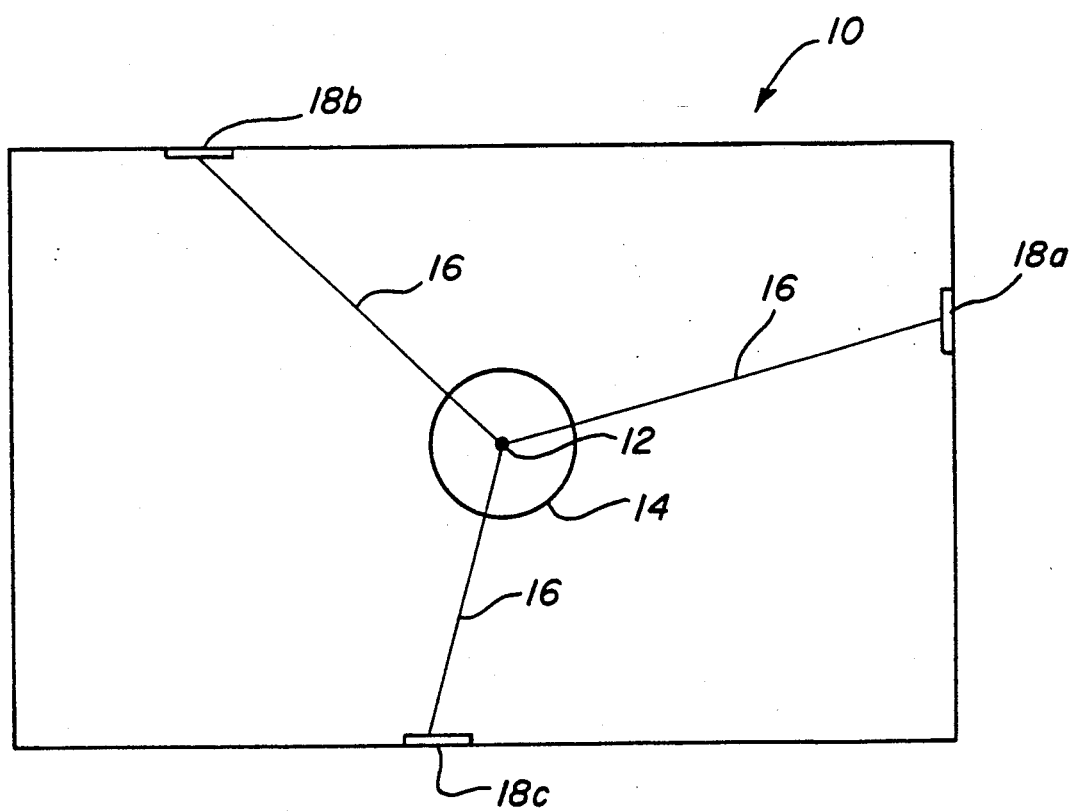
FIG. 1 is a plan view of the position sensing system of the present invention located at a point within a structured environment defined by four intersecting walls.
Figure 2:
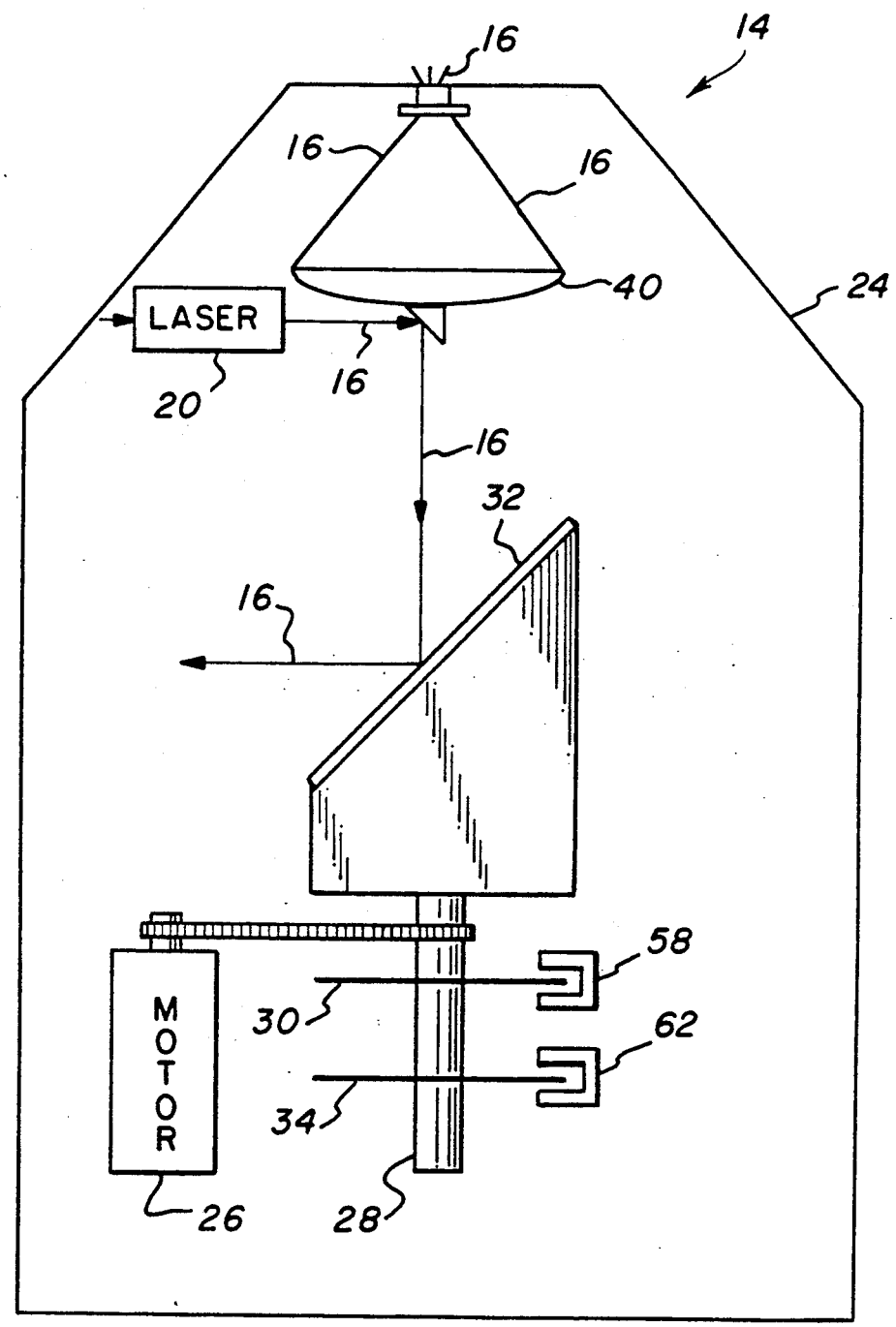
FIG. 2 is a side view, with parts broken away, of a light transmitting and detecting means of the position sensing system of FIG. 1.
Figure 6:
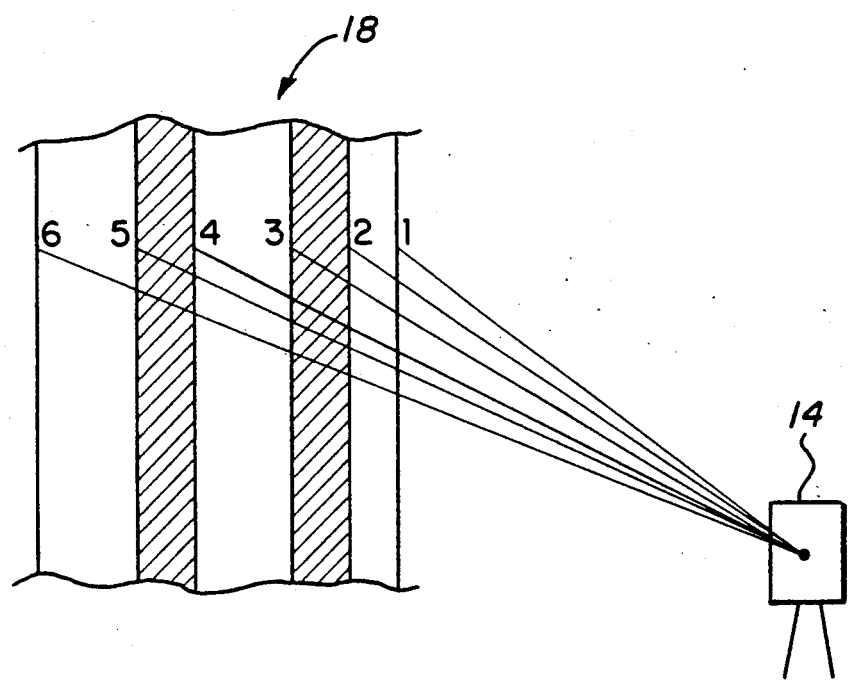
FIG. 6 is a diagrammatic representation of the position sensing system transmitting a beam of light toward a distinctive retroreflective bar code element in accord with the block diagram of FIG. 5 and bar code recognition software.

The position sensing system and method of the present invention is advantageously utilized in either a structured environment 10, as shown in FIG. 1, or an external environment, to generate constantly updated information on the exact location of a point 12. Typically, light transmitting and detecting means 14, best illustrated in FIG. 2, is positioned at the point 12 for transmitting a rotating beam of light 16, which is emitted by a light source such as laser 20 of FIG. 2, and reflected back to the light transmitting and detecting means 14 by a series of retroreflective elements 18. The position sensing system is also capable of determining the orientation of the light transmitting and detecting means 14 which is positioned at the point 12. The rotating beam of light 16 should be of a size appropriate to create discernible START signals and END signals from each of the retroreflective elements 18, which may consist of distinctive retroreflective bar code elements, as best illustrated in FIG. 6.

The position sensing system has at least three stationary retroreflective elements 18, as typified by elements 18a, 18b, and 18c in FIG. 1. Preferably, the retroreflective elements 18a, 18b, and 18c are spaced apart from each other around the periphery of the frame of reference and stationed at known coordinates in the two-dimensional frame of reference 10. In a preferred embodiment of the present invention, the retroreflective elements 18 are passive sensors, although active sensors may be used as well. With the passive sensor elements 18, the beam of light 16 is reflected back to the light transmitting and detecting means 14. Azimuth means (not shown), responsive to the reflection of the beam of light 16 from the retroreflective elements 18, continuously transmit angle signals, indicative of an azimuth angle at which the light transmitting and detecting means for receiving the beam of light is positioned with respect to each of the retroreflective elements 18, to a computer 22 of FIG. 5. The computer 22 includes a microprocessor, such as a Motorola 68030, having memory means for providing storage of software and data. A listing of exemplary software for performing the angle measurements in accordance with the present invention is included following the detailed description.

Since the reflection from one passive element 18 looks the same as the reflection from each of the other passive elements 18, it cannot be determined from the reflection itself which element 18 is being illuminated. Therefore, according to one aspect of the present invention, any or all of the retroreflective elements 18a, 18b, and 18c can have a unique bar code in order to differentiate one element from the others. The moment of illumination of each retroreflective element 18 is registered extremely accurately since that moment is decisive for determining the angle within the angle of rotation of 360 degrees. By recognizing the retroreflective elements 18a, 18b, and 18c individually, it is possible to assign the proper coordinates to each element 18, which is necessary for the calculation of the position of the point and the determination of the orientation of a position sensing system located at the point 12. Assigning a unique bar code to each element 18 distinguishes each of the elements 18a, 18b, and 18c from the others. The computer 22 includes a microprocessor, such as a Motorola 68030, having memory means for providing storage of software and data. A listing of exemplary software for performing the bar code recognition of the present invention is included following the detailed description.

Using the angle measurements and the recognized bar code patterns, the X-Y coordinates of the point 12 can be calculated by triangulation. The computer 22 includes a microprocessor, such as a Motorola 68030, having memory means for providing storage of software and data. A listing of exemplary software for performing the triangulation calculations of the present invention is included following the detailed description.

Referring now to FIG. 2, a side view of a housing 24 containing the light transmitting and detecting means 14 is shown. The light transmitting and detecting means 14 includes an electric motor 26 mounted to rotate shaft 28. A member 30, such as a code wheel, and a light diverting mirror 32 are mounted on the shaft 28. An index wheel 34 can also be included for providing a single reference pulse indicating each complete rotation of the shaft 28. A light source, such as solid state laser 20, directs the beam of light 16 onto the rotating mirror 32 so that a plane of rotation is created. In a preferred embodiment of the invention, a generally horizontal plane of rotation is created. However, any plane of rotation, including vertical, can be created. The retroreflective elements 18 are positioned in this plane. An advantage of the present invention is that a precisely horizontal or vertical plane is not essential for angle calculation. As a result, the system may be used either by an operator as a handheld device as the operator moves about the environment of interest, or mounted on vehicles and other equipment as the equipment moves about a given area.

Figure 5:
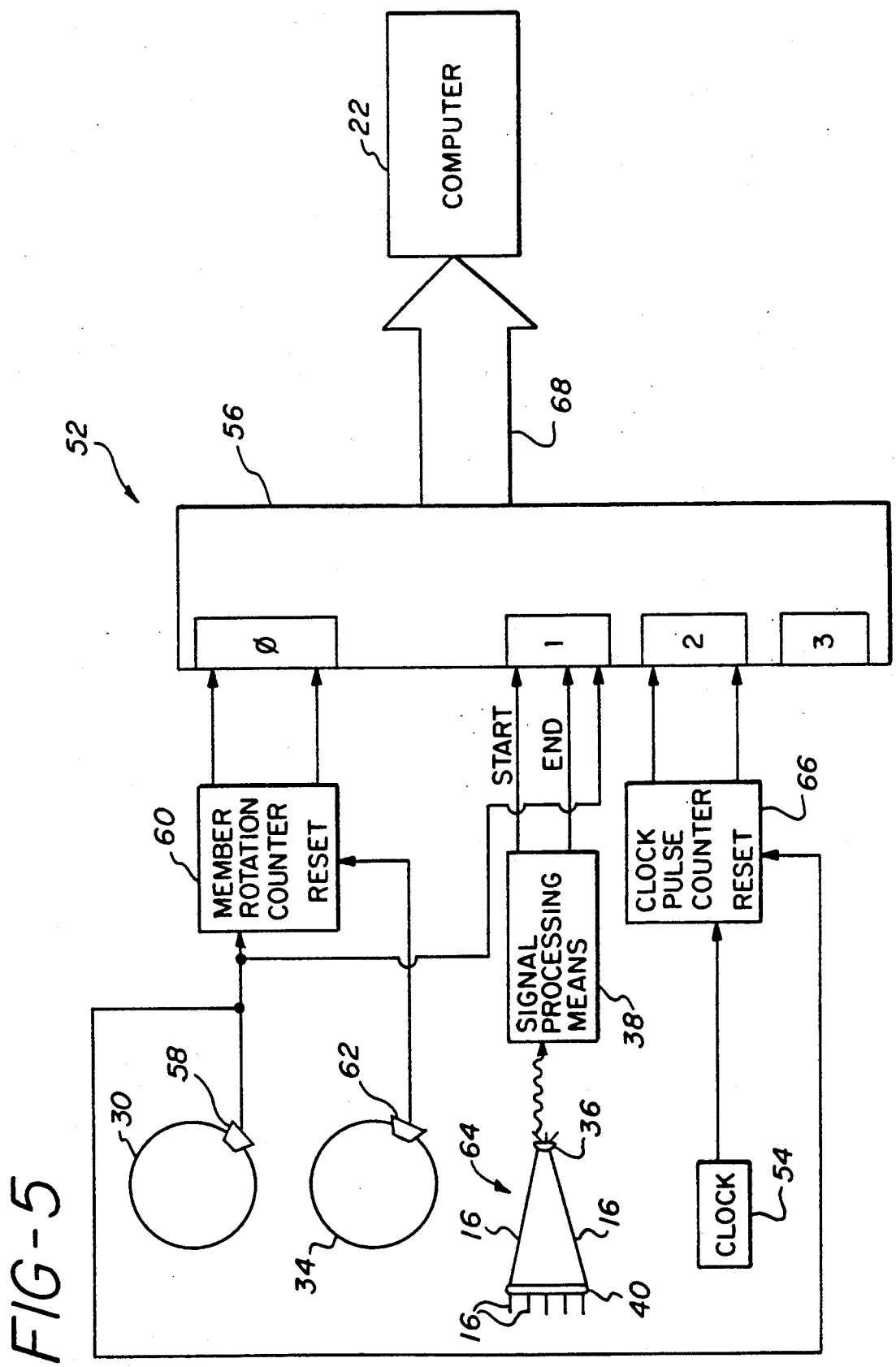
FIG. 5 is a schematic block diagram of a hardware interface, controlled by software, which supports the position sensing system of the present invention.

When the rotating laser beam 16 strikes the retroreflective elements 18 during each revolution of the shaft 28, the beam of light 16 is reflected back to the light transmitting and detecting means 14 and can be transformed into an analog signal by a suitable detector, such as photodetector 36, and transmitted to a signal processing means 38 of FIG. 5, which outputs two digital signals. The light transmitting and detecting means 14 may include means for diverting and focusing the returning beam to the photodetector 36. In FIG. 2, the rotating mirror 32 diverts the light beam 16 toward a collimating lens 40, which lens 40 focuses the light beam 16 toward the photodetector 36. Theoretically, the moment in time that a retroreflective element 18 has been illuminated with respect to the complete time of rotation is related to its angle, depending on which retroreflective element 18 is being illuminated by the light beam 16, within a total angle of 360 degrees. However, this is only the case if the rotational speed of the beam 16 is extremely constant. Typically, the rotational speed of motor shaft 28 which causes the beam 16 to rotate is not perfectly constant and it is not possible to obtain a constant speed with the accuracy which is desired by the position sensing system of the present invention, especially in a mobile operation. Consequently, the position sensing system utilizes the motor 26 in conjunction with the member 30, supported by the dedicated hardware interface of FIG. 5 and controlled by software to achieve the desired accuracy. The computer 22, having a microprocessor such as a Motorola 68030, contains software for a main routine which controls the hardware interface of the position sensing system, an exemplary listing of which is included following the detailed description.

Figure 3:
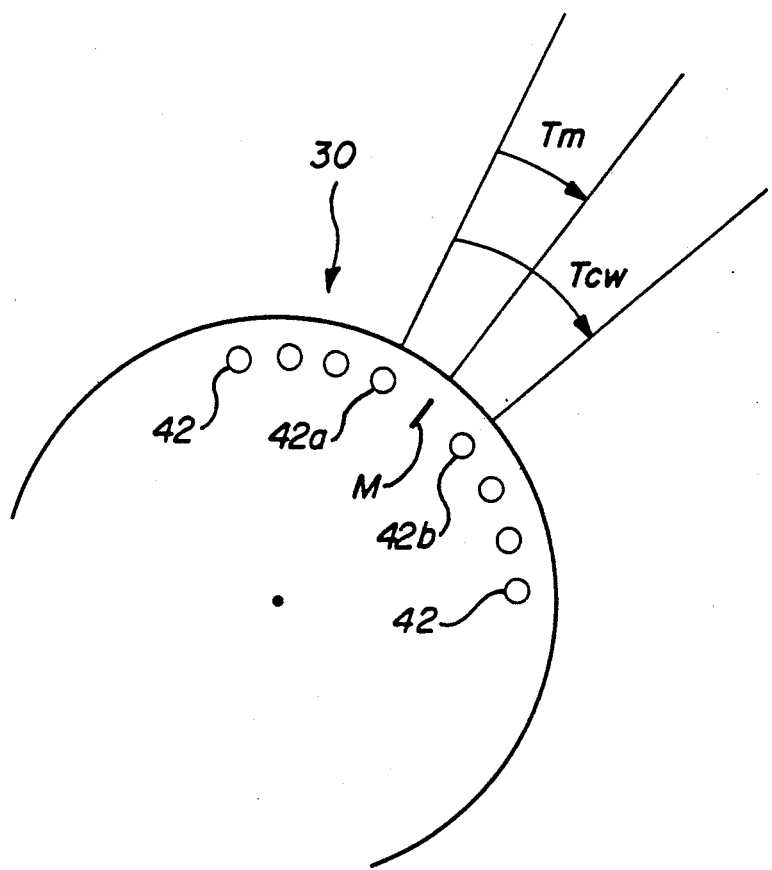
FIG. 3 is an exploded partial top view of a rotating member illustrated in FIG. 2.

As shown in FIG. 3, the member or code wheel 30 has a plurality of angularly positioned elements, preferably apertures 42, spaced around its periphery which divide a revolution of the member 30 into a plurality of generally equal partial revolutions. The size and spacing of these apertures are greatly exaggerated in the drawing for clarity of illustration. For example, the code wheel 30 may divide a revolution into one thousand generally equal parts positioned approximately 0.36 degrees apart by spacing one thousand elements or apertures 42 around the periphery of the member 30. Although the distance between each adjacent pair of apertures 42 theoretically represents a movement of 0.36 degrees, misalignment of the member 30, misalignment of the center of the member 30 through which the shaft 28 extends, and manufacturing tolerances, cause deviations in the spacing of the elements 42. However, since these deviations remain constant once the light transmitting and detecting means 14 is assembled, the actual angular spacing between each element 42 in the member 30 can be determined extremely precisely by a software calibration table.

Calibration of the code wheel or member 30, preferably using software, improves accuracy by eliminating errors due to misalignments, deviations, and irregularities of the rotational speed of the motor 26. Any speed fluctuation of the motor 26 between two apertures 42, particularly when there are one thousand such apertures spaced around the periphery of the member 30, will be negligible. Consequently, it is possible to interpolate between an adjacent pair of apertures, such as 42a and 42b in FIG. 3, to determine an exact angle between the pair of apertures 42a and 42b, according to the equations:

$$\text{Angle} = \angle 42a + (Tm/Tcw)*(\angle 42b - \angle 42a)$$

where $\angle 42a$ is the measured angle of aperture 42a; Tm is the time elapsed between passage of the previous aperture, here aperture 42a, and the moment M in time that the reflecting light strikes the sensor or photodetector 36; and Tcw is the time it takes the code wheel 30 to move between element 42a and element 42b.

Figure 4:
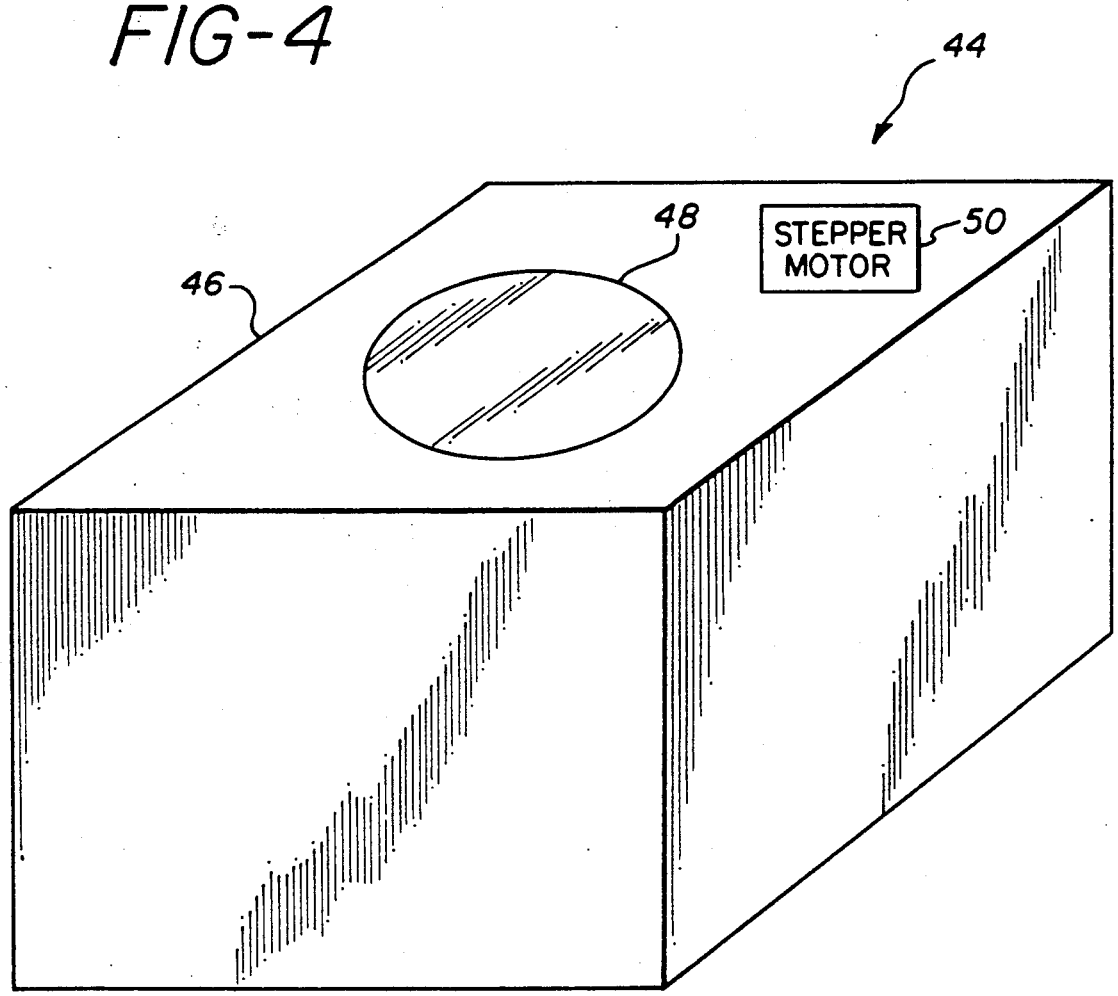
FIG. 4 is a calibrating system which is used in conjunction with related software to calibrate the member of FIG. 3.

One method of calibrating the code wheel or member 30 is illustrated in FIG. 4 as a calibration system 44. To calibrate the member 30, the light transmitting and detecting means 14 containing the code wheel 30, is placed on a device 46 having an angularly positioned rotating surface 48 such that the spin axis of shaft 28 containing code wheel 30 is concentric to surface 48 of device 46, with the member 30 arbitrarily positioned. The computer 22 of FIG. 5 controls a stepper motor 50 associated with the surface 48 and determines the number of steps between each pair of adjacent elements 42 as the member 30 rotates. For instance, if one revolution of the member is defined as 360,000 steps, and the member 30 contains 1000 generally equally spaced elements 42, then each step would theoretically be expected to be equal to 0.001 degree, and each element 42 would be 0.36 degrees or 360 steps from each adjacent element 42. However, in reality, there will be deviations in the spacing of the elements 42. Therefore, the actual spacing between each adjacent pair of elements 42 is measured and can be stored in a calibration table, which table will remain accurate as long as the position sensing system of the present invention remains assembled.

Initially, in calibrating the member 30, a first element 42 receives a signal from a reference retroreflective element, and this first element 42 becomes an index element for purposes of calibration of the member 30. The calibration system 44 determines when the index and following elements 42 are in position to commence or end the counting of the steps between elements 42 by employing the interpolation equation from above. For the index element 42, Tcw equals zero and Tm equals zero. As the member 30 rotates toward the next adjacent element 42, Tm approaches zero and Tcw approaches 1. The moment in time when Tm is equal to zero and Tcw is equal to one, then the element 42 is in position to end the counting of steps between the index element and the first adjacent element. This pattern continues until the number of steps and, thus, the distance in degrees between, each pair of adjacent elements 42 has been determined. The calibrating system 44 is associated with the computer 22 which includes a microprocessor, such as a Motorola 68030, having a memory means for providing storage of software and data. A listing of exemplary software for performing the calibration of the member 30 of the present invention is included following the detailed description.

The position sensing system which combines the use of the code wheel 30 and the motor 26 is supported by a hardware interface 52, illustrated in FIG. 5. An event occurs every time an aperture 42 on the code wheel 30 passes, or a retroreflective element 18 commences or ends a reflection of the beam of light 16. Due to the high precision time measurements required between each adjacent pair of apertures 42, a reference clock 54 is used in keeping a record of an event. If an event occurred during this time, it is stored in a circuit 56, such as a 32 bit first-in- first-out circuit. The circuit 56 records the movement of the code wheel 30 at register 0. The actual element or aperture 42 which is currently passing is sensed at a member or code wheel pick up element 58 and counted by a member rotation counter 60. Each time the member 30 has completed a full rotation, an index pick up element 62 sends a signal to reset the member rotation counter 60. The member pick up element 58 and the index pick up element 62 comprise means for detecting movement of each of the elements 42 past a predetermined point as the member 30 rotates. In a preferred embodiment of the present invention, the pick up elements 58 and 62 comprise a light source paired with a photodetector element.

Signal processing means 38 detect when receiving optics 64, consisting of collimating lens 40 and photodetector 36, is either commencing receipt of the reflection of the light beam 16 or ending receipt of the reflection of the light beam 16 from the retroreflective elements 18 to the light transmitting and detecting means 14. Signal processing means 38 can transform the analog signal from photodetector 36 into two digital signals which are received at register 1 of circuit 56. The first digital signal represents a START signal which indicates if the reflection from retroreflector 18 is commencing the reflection of beam 16 from the retroreflective elements 18 to the light transmitting and detecting means 14, and the second digital signal is an END signal which indicates if the reflection is ending. Register 2 receives signals for measuring the time elapsing between the passage of the last aperture 42 and an event, which event may be the time Tm or the time Tcw shown in FIG. 3. A clock pulse counter 66 is reset at a clock pulse for counter 60 for each aperture 42, which counter 66 counts the time elapsing between the passage of each pair of adjacent elements 42. Information regarding the capacity of the circuit 56 is stored in register 3.

The circuit 56 stores the information received and provides an output signal 68 to the computer 22 which includes a microprocessor having memory means. The computer 22 is responsive to the output signal 68, to compute the coordinates of the position of the point 12 in the two-dimensional coordinate frame of reference 10. When the light transmitting and detecting means 14 is positioned at point 12, the computer 22 also computes the orientation of the light transmitting and detecting means 14 within the frame of reference 10.

When bar codes are used with the retroreflective elements 18, each element 18 may have a unique series of START and END signals, as illustrated in FIG. 6. In FIG. 6, retroreflector 18 receives a beam of light from light transmitting and detecting means 14. As the rotating beam 16 sweeps past the bar code of the retroreflective element 18, angle 1 starts a reflection back to the light transmitting and detecting means 14 which is detected by the signal processing means 38 of FIG. 5 and output as a START signal to the circuit 56. The reflection is momentarily stopped between angles 2 and 3, before starting again at angle 3. Similarly, the reflection stops between angles 4 and 5, but starts again at angle 5. Finally, the reflection from the retroreflector element 18 ends at angle 6, where the retroreflective element ends. Remaining retroreflective elements may have different bar code patterns which would send a unique sequence of START and END signals to the circuit 56.

A representative listing of exemplary software for performing angle measurements, performing triangulation calculations, controlling the hardware interface of the position sensing system, and performing calibration is as follows.

SPC 061 PA
```
GetAngles()
{
struct trans *t;
struct angle *a;
register int ia, na, itr, isensor;

itr     = 0;
        t       = T;

while( itr < Ntrans ) {
                if( isensor=RefWndw(t) ) {
                        if( (isensor>0) && (isensor<MAX_SENSOR) ) {
                                Aave[isensor]   += ARef(t);
                                Nave[isensor]   += 1;
                                itr     += 8; t += 8;
                        }
                }
                else {
                        itr++; t++;
                }
        }

/*
        if( (Ticks-Pticks) < 200 )      return(1);
        Pticks  = Ticks;
*/ a                       = A;
        a->a                    = M_2PI;
        a->isensor              = 0;
        na                      = 1;
        a++;

for( ia=1; ia<MAX_ANGLE; ia++ ) {
                if( Nave[ia] ) {
                        a->isensor      = ia;
                        a->a            = Aave[ia]/Nave[ia];
                        a++; na++;
                }
                Aave[ia]        = 0.0;
                Nave[ia]        = 0;
        } if( RqAngle == -1 ) {
                for( ia=0; ia<na; ia++ ) copA[ia] = A[ia];
                RqAngle = na;
        } return( na );
}

GetTrans()
{
struct event *e;
struct trans *t;
register int i, ntr, iev;
register int icw, stime, ctime;

ntr     = 0;
        iev     = 0;
        e       = E;
        t       = T;
```

```
        while( iev<Nevent ) {
                if( !(e->icw&CW) ) {
                        e++; iev++;
                }
                else {
                        icw     = e->icw&CWHL_MASK;
                        stime   = e->time&TIME_MASK;
                        ctime   = Tcw( icw+1 );
                        t->a    = Cangle[icw] + CwInter(stime);
                        if( !(e->icw&R_START) ) t->type = R_START;
                        else
                        if( !(e->icw&R_END) )   t->type = R_END;
                        else                    t->type = -1;

e++; iev++;
                        t++; ntr++;
                }
        } if( RqTrans == -1 ) {
                for( i=0; i<ntr; i++ ) copT[i] = T[i];
                RqTrans = ntr;
                if( RqTrans == 0 ) {
                        RqAngle = 0;
                }
        } return( ntr );
}

GetEvent()
{
register int i;

if( RqEvent == -1 ) {
                for( i=0; i<Nevent; i++ ) copE[i] = E[i];
                RqEvent = Nevent;
                if( RqEvent == 0 ) {
                        RqTrans = 0;
                        RqAngle = 0;
                }
        } return( Nevent );
}

Intr()
{
int fifo;
register int i, icw;
register struct st *s = SF;

do {
                if( (Nevent>1023) || !(s->status&FULL) ) {
                        printf("Reset Fifo!!!\n");
                        FifoReset();
                } fifo    = s->data;
                icw = fifo & CWHL_MASK;
                if( !icw ) {
                        if( EnTime )    Stime(0);
                        GetPos( &CP );
                        pe      = E;
                        Nevent  = 0;
```

```
                }
                else {
                        *pe++ = *(struct event *)(&fifo);
                        Nevent++;
                }
        }
        while( s->status&EMPTY );
}
static float ARef( t )
struct trans t[];
{
float   a;

a = (t[0].a + t[7].a) / 2.0;

return( a );
}
Tcw( icw )
register int icw;
{
register int i, xcw;

for( i=0; i<Nevent; i++ ) {
                if( E[i].icw&CW )       continue;
                xcw = E[i].icw&CWHL_MASK;
                if( xcw == icw )        return( E[i].time&TIME_MASK );
        }
        return(-1);
}

FifoReset()
{
register int i;
register struct sf *s = SF;

Nevent  = 0;
        Ntrans  = 0;
        Nangle  = 0;
        RqEvent = 0;
        RqTrans = 0;
        RqAngle = 0;
        pe      = E;
        Pticks  = Ticks;
        i       = s->reset;

for( i=0; i<MAX_ANGLE; i++ ) {
                Aave[i] = 0.0;
                Nave[i] = 0;
        }
}
static float BarPos[] = { 0.16, 0.23, 0.29, 0.35, 0.41,
                          0.47, 0.53, 0.59, 0.65 };

RefWndw( t )
struct trans t[];
{
float diff, tdiff;
register int i, itr;
float as, ae, a0, a1;

if( !(t[0].type&R_START) )      return(0);
        tdiff = t[0].a - t[7].a;
        if( tdiff > 0.114 )             return(0);
        if( !(t[1].type&R_END) )        return(0);
        if( !(t[2].type&R_START) )      return(0);
```

```
            if( !(t[3].type&R_END) )         return(0);

if( !(t[4].type&R_START) )       return(0);
            if( !(t[5].type&R_END) )         return(0);

if( !(t[6].type&R_START) )       return(0);
            if( !(t[7].type&R_END) )         return(0);

tdiff  = 1.0 / tdiff;
            as     = (t[0].a-t[2].a) * tdiff;
            ae     = (t[5].a-t[7].a) * tdiff;

if( (as<0.12) || (as>0.18) )     return(0);
            if( (ae<0.12) || (ae>0.18) )     return(0);

tdiff  = 1.00 / (t[2].a-t[5].a);
            diff   = (t[2].a - (t[3].a+t[4].a)/2.0) * tdiff;

for( i=1; i<9; i++ ) {
                    if( (diff>BarPos[i-1]) && (diff<BarPos[i]) )    return(i);
            }
            return(0);
} static float ARef( t )
struct trans t[];
{
float    a;

a = (t[0].a + t[7].a) / 2.0;

return( a );
}
Tcw( icw )
register int icw;
{
register int i, xcw;
for( i=0; i<Nevent; i++ ) {
        if( E[i].icw&CW )            continue;
        xcw = E[i].icw&CWHL_MASK;
        if( xcw == icw )             return( E[i].time&TIME_MASK );
}
return(-1);
#include        "cap.h"

#define CwInter(x)      (x*(Cangle[icw+1]-Cangle[icw])/ ctime);

float ARef();

int Nevent, Ntrans, Nangle;
static int RqEvent, RqTrans, RqAngle;

struct event    E[MAX_EVENT],   copE[MAX_EVENT];
struct trans    T[MAX_TRANS],   copT[MAX_TRANS];
struct angle    A[MAX_ANGLE],   copA[MAX_ANGLE];

struct event    *pe;
struct Co       *Sp;

static  int Pticks, Nave[MAX_ANGLE];
static  float    Aave[MAX_ANGLE];

struct  CurPos CP;
float x[MAX_ANGLE], y[MAX_ANGLE];
```

```
static float BarPos[] = { 0.16, 0.23, 0.29, 0.35, 0.41,
                          0.47, 0.53, 0.59, 0.65 };

GetPos( cp )
register struct CurPos *cp;
{
struct Co P;
struct Mc m1, m2;
register int i, sr, ipref;
float xpref, ypref, alfa;
register struct angle *p1, *p2;

Nevent   = GetEvent();
        Ntrans   = GetTrans();
        Nangle   = GetAngles();

if( Nangle < 4 )        return( 0 );

if( EnTime )    NxtTime();

p1       = &A[1];
        p2       = &A[2];
        m_coord( p1->isensor, p2->isensor, p2->a-p1->a, &m2 );
        p1++; p2++;
        ipref = Ppref( M_PI_2, 0);

for( i=1; i<Nangle-2; i++, p1++, p2++ ) {
                m1       = m2;
                m_coord( p1->isensor, p2->isensor, p2->a-p1->a, &m2 );
                alfa     = sq( &m1, &m2, p1->isensor, &P );
                ipref    = Ppref( alfa, i );
                x[i]     = P.x;   y[i]    = P.y;
        }
        cp->ipref       = ipref;
        cp->x           = x[ipref];
        cp->y           = y[ipref];
        cp->angle       = CapAngle( cp );
        cp->time        = Ticks;
        cp->nca++;

if( EnTime )    NxtTime();
}
m_coord( sa, sb, alfa, mc )
register int sa, sb;
float alfa;
struct Mc *mc;
{
float dx, dy;
float sinalfa, alfa2, k, beta, teta;

dx = S[sb].x - S[sa].x;
        dy = S[sb].y - S[sa].y;

k = sqrt( dx * dx  +  dy * dy);
        if( sinalfa=sin(alfa) ) mc->r = 0.5 * k / sinalfa;
        else                    mc->r = 0.0;

beta = xatan( dx, dy );
        alfa2= M_PI_2 - alfa;
        teta = alfa2 + beta;

mc->x = S[sa].x + mc->r * cos(teta);
        mc->y = S[sa].y + mc->r * sin(teta);
}
```

```c
float sq( m1, m2, sm, P )
struct Mc *m1, *m2;
register int sm;
struct Co *P;
{
float x1, y1;
float x2, y2;
float Tx, Ty, Tc, Tr;
float a1, a2;

x1 = m1->x; y1 = m1->y;
        x2 = m2->x; y2 = m2->y;
/*
 (x - x1)^2 + (y-y1)^2   =   r1^2
 (x - x2)^2 + (y-y2)^2   =   r2^2 x^2 - 2xx1 + x1^2  +  y^2 -2yy1 + y1^2  =   r1^2
 x^2 - 2xx2 + x2^2  +  y^2 -2yy2 + y2^2  =   r2^2
-------------------------------------------------
 2xx2 -2xx1 -x2^2 + x1^2  + 2yy2 -2yy1 - y2^2 + y1^2  =  r1^2 - r2^2
*/

Tx = 2.0 * x2 - 2.0 * x1;
        Ty = 2.0 * y2 - 2.0 * y1;
        Tc = -(x2 * x2 ) + (x1 * x1) - (y2 * y2) + (y1 * y1);
        Tr = (m1->r * m1->r) - (m2->r * m2->r );

Tx = -Tx / Ty;
        if( Ty )        Tc = (Tr - Tc ) / Ty;
        else            Tc = 0.0;
/*
 x^2 - 2xx1 + x1^2  +  y^2 -2yy1 + y1^2  =   r1^2
 x^2 - 2xx1 + x1^2  + (Tx+Tc)^2 - 2(Tx+Tc)y1 + y1^2 = r1^2
 x^2 - 2xx1 + x1^2  + (Tx^2x +2TxTcx +Tc^2) - 2(Tx+Tc)y1 + y1^2 = r1^
*/ a = 1.0 + (Tx * Tx );
        b = -2.0*x1 + 2.0 * Tx * Tc   -2.0 * Tx * y1;
        c = x1 * x1 + Tc * Tc   -2.0 * Tc * y1   + y1 * y1;
        c = c - (m1->r * m1->r );

P->x = -b / a  - S[sm].x;
        P->y = Tc + Tx * P->x;

a1 = xatan( m1->x-P->x, m1->y-P->y );
        a2 = xatan( m2->x-P->x, m2->y-P->y );
        return( fabs(a1-a2) );
}
float xatan( dx, dy )
float dx, dy;
{
float x;

if( (dx >= 0.0) && (dy >=  0.0) ) {
                if( dx == 0.0 ) x = M_PI_2;
                else            x = atan( dy / dx );
        }
        else
        if( (dx <  0.0) && (dy >=  0.0) ) {
                x = M_PI - atan( dy / -dx );
        }
        else
        if( (dx <  0.0) && (dy <   0.0) ) {
                x = M_PI + atan( -dy / -dx );
        }
        else
```

```
/*
        if( (dx >=  0.0) && (dy <  0.0) )
*/
        {
                if( dx == 0.0 ) x = 3*M_PI_2;
                else            x = 2*M_PI - atan( -dy / dx );
        }
        return( x );
} float CapAngle( cp  )
struct CurPos *cp;
{ float dx, dy, a;
register int ipref, i;
register struct Co *s;

ipref = cp->ipref;
        i = A[ipref].isensor;
        s = Sp + i;
        dx = s->x - cp->x;
        dy = s->y - cp->y;
        a = xatan( dx, dy ) - A[ipref].a - A_INDEX;
        if( a > M_2PI ) a -= M_2PI;
        if( a < 0.0   ) a += M_2PI;
        return( a );
}
Ppref( alfa, i )
float alfa;
register int i;
{
float temp;
static int ipref;
static float Apref;

if( !i ) {
                ipref = i;
                Apref = alfa;
                return(i);
        }
        if( alfa < 0.0 )       return(ipref);
        while( alfa > M_2PI )  alfa -= M_2PI;
        if( alfa < 0.0 )       return(ipref);
        while( alfa > M_PI )   alfa = M_2PI - alfa;

temp=fabs(alfa-M_PI_2);
        if( temp < Apref ) {
                ipref = i;
                Apref = temp;
        }
        return( ipref );
}
#include        <stdio.h>
#include        <setjmp.h>
#include        <math.h>
#include        "cap.h"

jmp_buf env_ctrlc;
static int SwFlags;
int Ndrws, DspClaim;
int PTicks, PFticks;
int Toggle, Xzoom, MMmode;

float Ralfa;
float x[MAX_ANGLE], y[MAX_ANGLE];
```

```
char Line[30], pLine[30];
int Timer(), IntrIndex(), IntrIr();

struct CurPos TmpCp, PrvCp;
char Header[] = "\n**** CAPSY ****\r\n";
char buffer[80], cmd[80], largs[80];

int Stdin, Stdout;

main()
{
int i;

Stdin = Stdout = 0;

if( TstDef() ) SetDefault( 0, 1 );

gen_coord(0);
        gen_cangle(0);

Ticks    = 0; PTicks    = 0; Toggle    = 0;
        EnTime   = 0; DspClaim  = 1; Xzoom     = 0;
        CP.x     = 0; CP.y      = 0; CP.time   = 0;
        CP.nca   = 0; CP.pnca   = 0; MMmode    = 0;
        CP.angle = 0; Ralfa     = 0;

for(i=0; i<25; Line[i++] = 0 );
        for(i=0; i<25;pLine[i++] = 0 );

I2cInit();
        FifoReset();

SetVector( AVEC6, Timer );
        SetVector( AVEC5, IntrIndex );
        SetVector( AVEC3, IntrIr );
        SetLvl( LVL2 );

Delay( 1.0 );

SetPtty( TERM );
        fprintf( Stdout, Header );
        fprintf( 0, "Tty to Std#%d.\n", Stdin );
        fprintf( 1, "Tty to Std#%d.\n", Stdin );

open_gfx();

if( setjmp( env_ctrlc ) ) {
                SetPtty( GRAPHICS );
                DrwMob( -Nmob );
                Nmob = Ncoord( Mob, MAX_MOB );
                DrwMark();
        }

SetPtty( GRAPHICS );

DspClaim= 0;
        MMmode  = 0;

TtyControl();
}

TtyControl()
{
register char c;
register int i=0;
```

```
        do {
                c = fgetc(Stdin);
                if( c & CTRL_CHAR )      CtrlControl( c );
        }
        while( c != '*' );

DspClaim = 1;
        SetPtty( TERM );

for(;;) { fprintf( Stdout, "Enter command:");
                if( !getcmd( cmd, largs ) )     c = 0;
                else                             c = cmd[0];
                fprintf( Stdout, "\n");

AE_cmd( c );

switch( c ) { case '2' :
                                DeFault();
                        break;

case '3' :
                                AeCmd();
                        break;

case '4' :
                                SwapTty();
                        break;

case '5' :
                                ManMove();
                                longjmp( env_ctrlc );
                        break;

case '6' :
                                ManScale();
                        break;

case '1' :
                                Update();

case '9' :
                                SetPtty( GRAPHICS );
                                open_gfx();

case  0  :
                        case '0' :
                                longjmp( env_ctrlc );
                        break;

}
        }
}

CtrlControl( c )
register char c;
{
register char c0=c;

DspClaim = 1;
        c &= 0x3f;
        switch( c ) {
```

```
                case '*' :
                case '0' :
                case '\r' :
                        ZoomCmd( c );
                        c0 = -1;
                        break;

case '1' :
                case '3' :
                        DirectMark( c );
                        SetPtty( GRAPHICS );
                        SwapGfx( Xzoom );
                        c0 = -1;
                        break;

case '9' :
                        SetPtty( GRAPHICS );
                        SwapGfx( Xzoom );
                        c0 = -1;
                        break;
        }
        DspClaim = 0;

return(c0);
}
AeCmd()
{
        fprintf( Stdout, " 1 = Events\n");
        fprintf( Stdout, " 2 = Angles\n");
        fprintf( Stdout, "Select type : ?");

getcmd( cmd, largs ); fprintf( Stdout, "\n");

if( cmd[0] == '1' )     cmd[0] = 'E';
        if( cmd[0] == '2' )     cmd[0] = 'A';

AE_cmd( cmd[0] );
}
SwapTty()
{
        if( Stdin == 0 ) {
                Stdin = Stdout = 1;
        }
        else
        if( Stdout == 1 ) {
                Stdin = Stdout = 0;
        }
        fprintf( 0, "Tty swap to Std#%d.\n", Stdin );
        fprintf( 1, "Tty swap to Std#%d.\n", Stdin );
}
ManMove()
{
register char c, c0;
register int step;
struct CurPos cp;

SetPtty( GRAPHICS );
        DspClaim= 0;
        MMmode  = 1;

for(;;) {
                cp = CP;
                if( !Xmove(&cp) ) return;
                CP = cp;
        }
```

```
}
ManScale()
{
register char c, c0;
register int step;
struct CurPos cp;

SetPtty( GRAPHICS );
        DspClaim= 0;
        MMmode  = 1;
        for(;;) {
                Xmove( &cp );
                CP       = cp;
        }
}
Xmove( cp )
register struct CurPos *cp;
{
register int step;
register char c, c0;

c = c0 = fgetc(Stdin);

step    = 100;
        if( c & CTRL_CHAR ) {
                c = CtrlControl( c );
                c &= 0x3f;
                step *= 5;
        } switch( c ) { case '6' : cp->x +=  step; break;
                case '4' : cp->x += -step; break;
                case '2' : cp->y +=  step; break;
                case '8' : cp->y += -step; break;

case '5' :
                        if( c0&CTRL_CHAR )      cp->angle -= degrad(15.0);
                        else                    cp->angle += degrad(15.0);

while( cp->angle > M_2PI ) cp->angle -= M_2PI;
                        while( cp->angle < 0.0 )   cp->angle += M_2PI;
                break;

case  0  :
                case '\n':
                case '\r':
                        return 0;
                break;

} cp->nca++;

return  1;
}
ZoomCmd( c )
register char c;
{
        if( c == '*' ) Xzoom--;
        else
        if( c == '\r' ) Xzoom++;
        else
        if( c == '0' ) Xzoom = 0;
```

```
            if( Xzoom < 0 )         Xzoom = 0;

if( Xzoom > 10 )        Xzoom = 10;

SwapGfx( Xzoom );
}

DirectMark( c )
register char c;
{
register int i;
struct CurPos cp;

cp = CP;
        if( c == '1' ) {
                DrwMob( -Nmob );
                FrzMob( &cp, Mob, Mrk );
                Nmrk = Ncoord( Mrk, MAX_MRK );
                DrwMark();
        }
        else
        if( c == '3' ) {
                DrwMob( -Nmob );
                for( i=0; i<MAX_MRK; i++ )       Mrk[i].x = Mrk[i].y = -1.0;
                Nmrk = Ncoord( Mrk, MAX_MRK );
                DrwMark();
        }
}
IntrTicks()
{

Ticks++;

if( !DspClaim && (Ticks-PTicks)>=(F_CLOCK/4) ) {
                TmpCp  = CP;
                gfx_point( &TmpCp );
                PTicks = Ticks;
        }
}
gfx_point( cp )
register struct CurPos *cp;
{
register int i;

/* if( (cp->nca==PrvCp.nca) && !MMmode ) { */ if( (cp->nca==PrvCp.nca) ) {
                if( Toggle ^= 1 ) {
                        DrwMob( -Nmob );
                        return;
                }
        }
        PrvCp = *cp;

cp->angle += Ralfa;
        if( !MMmode )   sprintf( Line, "X:%5.0f  Y:%5.0f  O:%5.1f",
                                cp->x, cp->y, raddeg(cp->angle) );
        else            sprintf( Line, "x:%5.0f  y:%5.0f  O:%5.1f",
                                cp->x, cp->y, raddeg(cp->angle) );
        Line[25] = 0;
        WrLine( Line );
        DrwMob( Nmob, cp, Mob );
}
```

```
WrLine( line )
register char *line;
{
register int i, x;
register char *p, *l;

p = pLine; l = line;

while( *l ) {
                if( *l != *p ) {
                        while( *l )     *p++ = *l++;
                        wstring( 6, 119, line );
                        return;
                }
                l++; p++;
        }
}
#include        <setjmp.h>
#include        <math.h>
#include        "cal.h"

#define         NxtA(x)         ((x>=Nangle)?x-Nangle+1:x)

struct Sensor S[MAX_SENSOR+1] = {
                0,      -1,     -1,
/*
                1,      1302,   6100,
                2,      0,      2397,
                3,      1077,   0,
                4,      3080,   4400,
*/
                1,      0,      0,
                2,      1000,   0,
                3,      2000,   0,
                4,      3000,   0,
                5,      -1,     -1,
                6,      -1,     -1,
                7,      -1,     -1,
                8,      -1,     -1,
                9,      -1,     -1,
                10,     -1,     -1,
                11,     -1,     -1,
                12,     -1,     -1,
                13,     -1,     -1,
                14,     -1,     -1,
                15,     -1,     -1,
                16,     -1,     -1
};

struct  angle A[MAX_ANGLE];

jmp_buf env_esc, env_ctrlc;

static int SwFlags;
int SwFlags, Ncalcu;
int PTicks, PFticks, PNcalcu;
int Tsteps;
int Gsteps, Gpatrn;

float GetIangle();
float x[MAX_ANGLE], y[MAX_ANGLE];

int Timer(), IntrIndex(), Trap15();
```

```
char *range();
struct CurPos CP;
char buffer[80], cmd[80], largs[80];

int Stdin, Stdout;

main()
{
int key;

llcd("** CALI CAPSY **");

setjmp( env_ctrlc );

gen_cangle(0);
        gen_coord(0);

Stdin    = 0;
        Stdout   = 0;
        Ticks    = 0; PTicks    = 0; PFticks    = 0;   Ncalcu  = 0;
        PNcalcu  = 0; Tsteps    = 0; base       = 10;
        Gsteps   = 0; Gpatrn    = 0;

I2cInit();
        IniC1();
        FifoReset();

Trap1( LVL6, Timer );
        Trap1( LVL5, IntrIndex );
        Trap1( 0xbc, Trap15 );
        Trap0( 0x0200 );

if( setjmp( env_esc ) ) {
                EscControl();
        }
        TtyControl();
}
TtyControl()
{
register int i;
register char c, cmd;

printf("\n");
        for(;;) {
                printf("Cal(%d) :", Tsteps);
                getcmd( buffer, largs ); printf("\n");
                cmd = buffer[0];

switch( cmd ) { case 'x' :
                        case 'X' :
                        break;

case 't' :
                        case 'r' :
                                FR_cmd( cmd, largs );
                        break;

case 'z' :
                                printf("Tsteps #%d set to ", Tsteps );
                                Tsteps = 0;
                                printf("%d.\n", Tsteps );
```

```
                        break;

case 'c' :
                case 'C' :
                        C_cmd( cmd, largs );
                        break;

case 'i' :
                case 'I' :
                        I_cmd( cmd, largs );
                        break;

case 't' :
                case 'T' :
                        T_cmd( cmd, largs );
                        break;

case 'S' :
                        S_cmd( cmd, largs );
                        break;

case 'D' :
                case 'F' :
                        D_cmd( cmd, largs );
                        break;

case 'n' :
                case 'N' :
                        N_cmd( cmd, largs );
                        break;

case 'G' :
/*
                        gfxcal( Cangle );
*/
                        break;

default :
                        AE_cmd( cmd, largs );
                        break;
                }
        }
}
C_cmd( cmd, largs )
register char cmd, *largs;
{
register int i;
register float *a;
float acal, acap, adif, anul;

Tsteps  = 0;
        a = (float *)0x18000;
        if( cmd == 'C' )        for( i=0; i<1000+1; i++ ) a[i] = -1.0;
        for(;;) {
                acal    = Tsteps/1000.0;
                acap    = Getlangle( 1, 50 );
                printf("%8d : %7.3f", Tsteps, acal );
                if( acap != -1.0 ) {
                        if( cmd == 'C' )        *a      = acap;
                        acap    = raddeg(acap);
                        if( !Tsteps )   anul    = acap;
                        acap -= anul;
                        if( acap < 0.0 )        acap += 360.0;
                        adif    = acap - acal;
                        printf(" - %7.3f = %7.3f\n", acap, adif );
```

```
            }
            else    printf(" *** angle not found ***\n");

if( (Tsteps+360) > 360000 )     break;
            Xstep( 360 );
            a++;
        }

}
I_cmd( cmd, largs )
register char cmd, *largs;
{
register int i;
register float *a;
float as, a0, a1, adif;

a = (float *)0x18000;

a1      = a[0];
        as      = a[0];
        for( i=0; i<1000; i++ ) {
                a0      = a1;
                a1      = a[i];
                if( a1 == -1.0 ) {
                        printf("%4d : Not Registered.\n", i);
                }
                adif    = a0-a1;
                printf("%4d : %10.3f(%6.3f) -> %10.3f.",
                        i, raddeg(a1), raddeg(adif), raddeg(as) );
                adif    = fabs(a0-a1);
                as      = a1 - a[0];
                if( (raddeg(adif) < 0.350) || (raddeg(adif)>0.370) ) {
                        printf("!!!!!!!!");
                }
                printf("\n");
        }
}
float GetIangle( ia, naverage )
register int ia, naverage;
{
float atot = 0.0;
register int i, nfound, ntries, na;

nfound = 0;
        ntries = 0;

for(;;) {
                na = CopAngles();
                for( i=0; i<na; i++ ) {
                        if( copA[i].isensor != ia )     continue;
                        atot += copA[i].a;
                        nfound++;
                        break;
                }
                if( nfound == naverage ) {
                        return( atot/naverage );
                }
                if( ++ntries > 2*naverage )
                        return( -1.0 );
        }
}

EscControl()
{
```

```
register char c1, c2;
register int xstep;

c1 = getch(); c2 = getch();

if( c2 == 'O' ) xstep = -1;
        else    if( c2 == 'C' ) xstep =  1;
        else                    xstep =  0;

Xstep( xstep );
}

N_cmd( cmd, largs )
register char cmd, *largs;
{
register int i;
register float *al = (float *)0x19000;

if( cmd == 'N' ) {
                for( i=0; i<NCW+1; i++ ) Cangle[i] = *al++;
                printf("Cal copied to Cangle.\n");
        } if( cmd == 'n' ) {
                gen_cangle(1);
                printf("Cangle initialised.\n");
        }
}

D_cmd( cmd, largs )
register char cmd, *largs;
{
register int i, icw;
float a, a0, a1, temp;
float step = M_2PI / 1000.0;
register float *ap = (float *)0x18000;
register float *al = (float *)0x19000;

for( i=0; i<1000+1; i++ ) al[i] = -1.0;

for( i=1; i<1000+1; i++ ) {
           a0      = ap[i-1];
           a1      = ap[i];
           if( (a0 == -1.0) || (a1 == -1.0) )       continue;
           temp    = a1/step - 0.5;
           icw     = temp;
           a       = icw * step;
           al[icw] = (i-1) * step + ((a-a0)/(a1-a0)) * step;
           temp    = al[icw];
           if(tstqual('p')) printf("%4d: %8.3f,%8.3f %4d %8.3f   %8.3f\n",
                    i,raddeg(a0),raddeg(a1),icw,raddeg(a),raddeg(temp));
        } clean_tab( al );

if( cmd == 'F' ) {
                printf("\nfloat Cangle[1000+1] = {");
                for( i=0; i<1000+1; i++ ) {
                        if( !(i%8) )    printf("\n");
                        temp    = al[i];
                        if( i != 1000 ) printf("%9.6f,", temp );
                        else            printf("%9.6f ", temp );
                }
                printf("\n};\n");
        }
```

```
            else {
                printf("\nCalibration :");
                for( i=0; i<1000+1; i++ ) {
                        if( !(i%5) )     printf("\n %10.3f :", (float)(i*0.360)
                        temp     = raddeg(Cangle[i]) - raddeg(al[i]);
                        if( i != 1000 ) printf("%9.3f,", temp );
                        else             printf("%9.3f ", temp );
                }
                printf("\n};\n");
        }
}
clean_tab( Ca )
float Ca[];
{
int nclns;
float temp, low_a, high_a, dif_a;
register int low_icw, high_icw, n_icw, i;

low_icw = 0;
        while( Ca[low_icw] == -1.0 ) low_icw = nxticw( low_icw);

for(;;) {
                nclns = 0;
                while( Ca[nxticw(low_icw)] != -1.0 ) {
                        low_icw = nxticw(low_icw);
                        low_a   = Ca[low_icw];
                        if( ++nclns > 1000 )   {
                                printf("Table cleaned.\n");
                                goto CLEANED;
                        }
                }
                if( tstqual('p') ) printf("low_icw=%d, low_a = %10.3f\n",
                                low_icw, raddeg(low_a) );

high_icw= nxticw(low_icw);
                while( Ca[high_icw] == -1.0 ) high_icw= nxticw(high_icw);
                high_a   = Ca[high_icw];

if( tstqual('p') )printf("high_icw=%d, high_a = %10.3f\n",
                         high_icw, raddeg(high_a) );

dif_a = high_a - low_a;
                n_icw  = high_icw - low_icw;
                if( n_icw < 0 ) n_icw += 1000;
                if( tstqual('p') )      printf("dif_a=%10.3f, n_icw=%d\n",
                                        raddeg(dif_a), n_icw );

dif_a /= n_icw;
                for( i=0; i<=n_icw; i++ ) {
                        temp = low_a + i * dif_a;
                        Ca[low_icw] = temp;
                        if( tstqual('p') )printf("%4d : %10.3f\n",
                                low_icw, raddeg(temp) );
                        low_icw = nxticw(low_icw);
                }
        }

CLEANED:
        temp = Ca[0];
        for( i=0; i<NCW; i++ ) {
                Ca[i] -= temp;
                if( Ca[i] < 0.0 )       Ca[i] += M_2PI;
        }

Ca[1000] = Ca[0];
```

```
}
static nxticw( icw )
register int icw;
{
        if( ++icw > 999 )       icw = 0;
        return( icw );
}

FR_cmd( cmd, largs )
register char cmd, *largs;
{
int nsteps;

if( largs )     range( largs, &nsteps, &nsteps );
        else            nsteps = 1;
        printf(" #%d steps %s.\n",
                nsteps, (cmd=='f')?"forwards":"reverse");

if( cmd == 'f' )        Xstep( nsteps );
        if( cmd == 'r' )        Xstep( -nsteps );
}
S_cmd( cmd, largs )
register char cmd, *largs;
{
int ns;
int S[5000];
int icw, stime, ctime;
register int i, j, imin, imax, hmax;

if( *largs )    range( largs, &ns, &ns );
        else            ns = 1000;

for( i=0; i<5000; i++ )  S[i] = 0;

printf("#samples:%4d ", ns );

imin = 5000; imax = 0; hmax = 0;
        for( i=0; i<ns; i++ ) {
                GetFTrans( &icw, &stime, &ctime );
                if( stime < imin )      imin = stime;
                if( stime > imax )      imax = stime;
                S[stime]++;
                if( S[stime] > hmax )   hmax = S[stime];
        } printf(" imin=%4d  imax=%4d  hmax=%4d\n", imin, imax, hmax );
        for( i=0; i<5000; i++ ) {
                if( S[i] == 0 ) continue;
                for( j=i; j<5000; j++ ) {
                        if( S[j] == 0 ) return;
                        printf("%4d:%4d ", j, S[j] );
                        plot_bar( 60 * S[j]/ hmax );
                        printf("\n");
                }
        }
} plot_bar( nstars )
register int nstars;
{
char bar[80];
register char *b;
register int i;
```

```
            *b = 0;
            printf("%s", bar );
}
T_cmd( cmd, largs )
register char cmd, *largs;
{
float a0, a1;
int nsteps, ntimes;

if( largs )     {
                cmd = *largs;
                largs = range( largs, &nsteps, &nsteps );
        }
        else            nsteps = 1;
        if( *largs )    largs = range( largs, &ntimes, &ntimes );
        else            ntimes = -1;

do {
                if( cmd != '-' ) {
                        a0 = GetIangle( 1, 50 );
                        printf("%d times #%d steps forwards(%8.3f)...",
                                                ntimes, nsteps, raddeg(a0) );
                        Xstep( nsteps );
                        a1 = GetIangle( 1, 50 );
                        printf("and reverse(%8.3f).\n", raddeg(a1));
                        Xstep( -nsteps );
                }
                else {
                        a0 = GetIangle( 1, 50 );
                        printf("%d times #%d steps reverse(%8.3f)...",
                                                ntimes, nsteps, raddeg(a0) );
                        Xstep( -nsteps );
                        a1 = GetIangle( 1, 50 );
                        printf("and forwards(%8.3f).\n", raddeg(a1) );
                        Xstep( nsteps );
                }
        }
        while( --ntimes );
}

Xstep( nsteps );
register int nsteps;
{ while( Gsteps );

if( nsteps>0 )  Gpatrn = FWD;
        else            Gpatrn = REV;

Gsteps = abs(nsteps);

while( Gsteps );
        Gpatrn = 0;
}
IniCT()
{
register struct pit *p = PIT;

p->pbcr = 0x80;
        p->pbddr= 0x1f;
        p->pbdr = 0x00;
}

IntrTicks()
{
```

```
            b = bar;
            while( nstars-- > 0 )    *b++ = '*';

register int t;
register struct pit *p = PIT;

Ticks++;

if( !(Ticks%3) && Gsteps ) {
        p->pbdr = Gpatrn;
        Gsteps--;
        if( Gpatrn == FWD )      Tsteps++;
        else                     Tsteps--;
}
else    p->pb
```

Having described the invention in detail and by way of reference to preferred embodiments thereof, it will be apparent that modifications and variations are possible without departing from the scope of the invention defined in the appended claims.

What is claimed is:

1. A system for determining the position of a point in a two-dimensional coordinate frame of reference, the system comprising:
    at least three stationary retroreflective elements spaced apart from one another and stationed at known coordinates in the two-dimensional coordinate frame, each of said retroreflective elements including identification means thereon for reflecting light back toward a light source, said reflected light from each of said elements including information generated by said identification means for uniquely identifying each of said elements;
    light transmitting and detecting means, positionable at the point, for generating a rotating beam of light to illuminate said identification means on each of said stationary retroreflective elements during each rotation, and for detecting said reflected light from said identification means on each of said elements and generating an output signal in response thereto;
    angle determining means for detecting the angular orientation of said reflected light when said reflected light is detected by said transmitting and detecting means; and
    computer means for computing from said known coordinates of said retroreflective elements, the angular orientation of said reflected light detected by said angle determining means, and said output signal generated in response to said reflected light from said identification means on each of said elements, the coordinates of the position of the point in the two-dimensional coordinate frame of reference.

2. A system for determining the position of a point as claimed in claim 1 wherein said light transmitting and detecting means comprises:
    means for generating a beam of light;
    means for projecting said beam of light at a substantially constant rotating angular velocity toward said retroreflective elements;
    means for receiving said beam of light reflected from said retroreflective elements corresponding to said illumination of each of said retroreflective elements during each rotation of said beam; and
    azimuth means, responsive to reflection of said beam of light from said retroreflective elements, for continuously transmitting angle signals indicative of an azimuth angle at which said means for receiving said beam of light is positioned with respect to each of said retroreflective elements.

3. A system for determining the position of a point as claimed in claim 1 wherein said computer means are capable of determining an orientation of said light transmitting and detecting means when said light transmitting and detecting means are positioned at the point.

4. A system for determining the position of a point as claimed in claim 1 wherein said identification means on each of said at least three stationary retroreflective elements is a distinctive retroreflective bar code.

5. A system for determining the position of a point in a two-dimensional coordinate frame of reference, the system comprising:
    at least three stationary retroreflective elements spaced apart from one another and stationed at known coordinates in the two-dimensional coordinate frame, each of said retroreflective elements including identification means thereon for reflecting light back toward a light source, said reflected light from each of said elements including information generated by said identification means for uniquely identifying each of said elements;
    light transmitting and detecting means, positionable at the point, for generating a rotating beam of light to illuminate said identification means on each of said stationary retroreflective elements during each rotation, and for detecting said reflected light from said identification means on each of said elements and generating an output signal in response thereto, said light transmitting and detecting means including
        a member rotating with said beam, said member having a periphery and further having a plurality of angularly positioned elements spaced around said periphery which divide a revolution of said member into a plurality of generally equal partial revolutions, and
        a means for detecting movement of each of said elements past a predetermined point as said member rotates; and computer means, responsive to said output signal generated in response to said reflected light from said identification means on each of said elements and said means for detecting movement of each of said elements past a predetermined point, for computing the coordinates of the position of the point in the two-dimensional coordinate frame of reference.

6. A system for determining the position of a point as claimed in claim 5 further comprising a calibrating system for calibrating said light transmitting and detecting means.

7. A system for determining the position of a point as claimed in claim 6 wherein said calibrating system comprises:
- a device having an angularly positioned surface for arbitrarily positioning said light transmitting and detecting means, wherein said light transmitting and detecting means include said member rotating with said beam; and
- means for measuring a distance between a first said angularly positioned element and an adjacent second said angularly positioned element.

8. A system for determining the position of a point as claimed in claim 5 wherein said plurality of angularly positioned elements comprise a plurality of apertures.

9. A system for determining the position of a point as claimed in claim 5 wherein said means for detecting movement of each of said elements comprises a light source paired with a photodetector element.

10. A system for determining the position of a point in a two-dimensional coordinate frame of reference, the system comprising:
- at least three stationary retroreflective elements spaced apart from one another and stationed at known coordinates in the two-dimensional coordinate frame, each of said retroreflective elements including identification means thereon for reflecting light back toward a light source, said reflected light from each of said elements including information generated by said identification means for uniquely identifying each of said elements;
- light transmitting and detecting means positionable at the point for generating a rotating beam of light to illuminate said identification means on each of said stationary retroreflective elements during each rotation and for receiving said reflected light from said identification means on each of said elements, said light transmitting and detecting means including
  - an optical member rotating with said beam, said member having a periphery and further having a plurality of apertures located at said periphery which divide a revolution of said member into a plurality of generally equal partial revolutions, and
  - a means for registering a time differential between each adjacent pair of said plurality of apertures as said member rotates; and
- computer means, responsive to said output signal generated in response to said reflected light from said identification means on each of said elements and said means for registering a time differential between each pair of said plurality of apertures, for computing the coordinates of the position of the point in the two-dimensional coordinate frame of reference and for computing an orientation for said light transmitting and detecting means when said light transmitting and detecting means are positioned at said point.

11. A method for determining the position of a point in a two-dimensional coordinate frame of reference, the method comprising the steps of:
- locating at least three stationary retroreflective elements spaced apart from one another and stationed at known coordinates in the two-dimensional coordinate frame, each of said retroreflective elements including identification means thereon for reflecting light back toward a light source, said reflected light from each of said elements including information generated by said identification means for uniquely identifying each of said elements;
- transmitting a rotating beam of light in a plane to illuminate said identification means on each of said stationary retroreflective elements during each rotation of said beam of light;
- measuring said rotation of said beam of light between successively illuminated retroreflective elements when said beam of light illuminates each of said retroreflective elements;
- using said rotation of said beam of light to calculate angular measurments between each of said retroreflective elements; and
- determining the position of the point based on said angular measurements, said information generated by said identification means for uniquely identifying each of said retroreflective elements, and said coordinates of said retroreflective elements.

12. A method for determining the position of a point as claimed in claim 11 wherein said step of tracking behavior of a rotation further includes the steps of:
- mounting a member on a rotating shaft, said member having a periphery and further having a plurality of apertures located at said periphery which divide a revolution of said member into a plurality of generally equal partial revolutions; and
- registering a time differential between each adjacent pair of said plurality of apertures as said member rotates.

13. A method for determining the position of a point as claimed in claim 11 wherein said step of determining the position of the point further includes the step of determining an orientation for said rotating beam of light when said rotating beam of light is positioned at the point.

14. A method for determining the position of a point as claimed in claim 12 further including the step of interpolating between corresponding angle measurements between said each adjacent pair of said plurality of apertures to determine exact angles between each of said adjacent pair of said plurality of apertures.

15. A system for determining the position of a point in a two-dimensional coordinate frame of reference, the system comprising:
- at least three stationary retroreflective elements spaced apart from each other and stationed at known coordinates in the two-dimensional coordinate frame, said retroreflective elements capable of reflecting light back toward a light source;
- light transmitting and detecting means, positionable at the point, for generating a rotating beam of light to illuminate each of said stationary retroreflective elements during each rotation, and for detecting said beam of light when it is reflected from said stationary retroreflective elements and generating an output signal in response thereto, said light transmitting and detecting means including
  a member rotating with said beam, said member having a periphery and further having a plurality of angularly positioned elements spaced around said periphery which divide a revolution of said member into a plurality of generally equal partial revolutions, and
  a means for detecting movement of each of said at least three retroreflective elements past a predetermined point as said member rotates;
a calibrating system for calibrating said light transmitting and detecting means, said calibrating system including
  a device having an angularly positioned surface for arbitrarily positioning said light transmitting and detection means, wherein said light transmitting and detecting means include said member rotating with said beam; and
  means for measuring a distance between a first said angularly positioned element and an adjacent second said angularly positioned element; and
computer means, responsive to said output signal and said means for detecting movement of each of said elements past a predetermined point, for computing the coordinates of the position of the point in the two-dimensional coordinate frame of reference.

* * * * *